Dec. 2, 1930.  J. E. SCHRODER  1,783,939
APPARATUS FOR HANDLING GLASSWARE
Filed Oct. 13, 1927
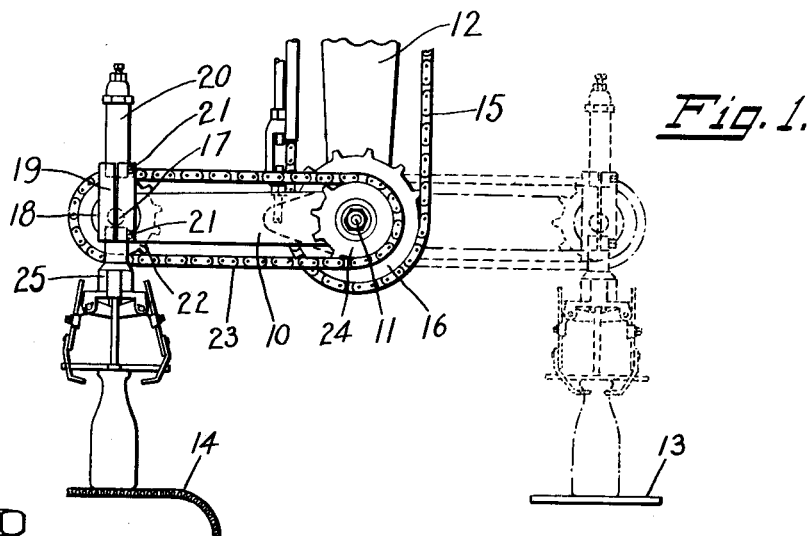
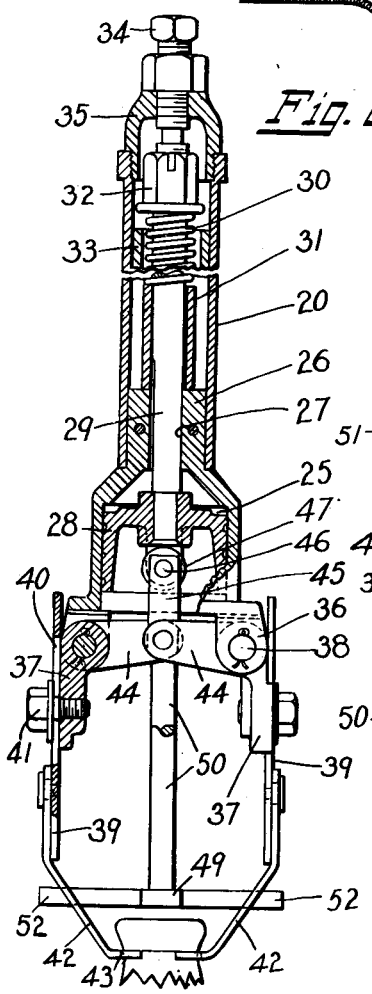
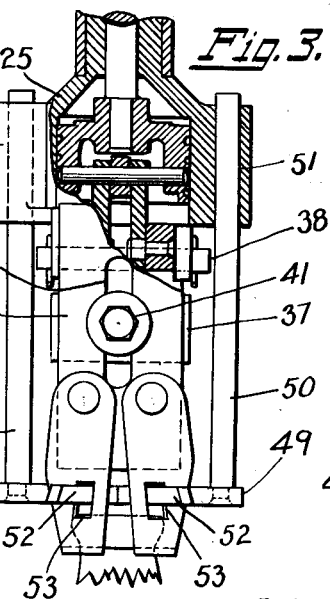
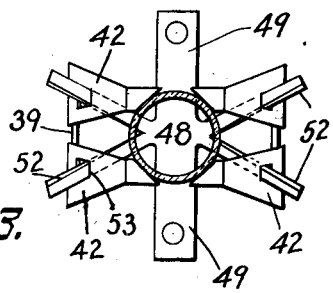
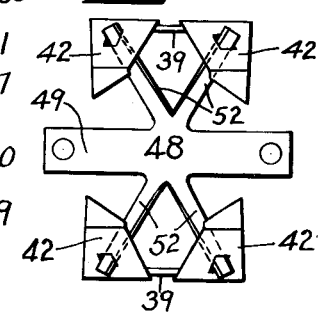
Inventor
John E. Schroder
by Robert A. Brown
Attorney Patented Dec. 2, 1930

1,783,939

UNITED STATES PATENT OFFICE

JOHN E. SCHRODER, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR HANDLING GLASSWARE

Application filed October 13, 1927. Serial No. 225,976.

The present invention relates to apparatus for handling articles of glassware and it has particular relation to devices for picking up bottles or other articles, at one place, and depositing them at another place. The invention is illustrated as incorporated in a stacker for placing articles of glassware in an annealing lehr. A stacking device to which this invention may be applied is disclosed in the application of Edward H. Lorenz, Serial No. 204,875. The invention may also be employed for transferring glassware or other articles from one position to another for other purposes, and is not necessarily limited to apparatus for placing ware in a lehr. For instance, it might be employed in taking finished glassware out of the molds and depositing it on a buck.

One of the objects of the present invention is to provide a device of the character described, that is particularly adapted to adjust itself automatically while in operation to handle ware having neck portions of varying diameters such as may be produced by two or more separate and independent shaping machines or by a single machine having molds for fabricating ware of different types, regardless of the order or sequence in which such ware arrives at the transfer station.

A further object is to provide such a device adapted to adjust itself automatically to handle ware varying in height and in neck diameters.

Other objects will appear from the following specification and the appended claims.

In the accompanying drawings:—

Fig. 1 is a side elevational view of a transferring device constructed in accordance with the present invention.

Fig. 2 is a view of the tongs mechanism on a larger scale, partly in side elevation and partly in vertical section.

Fig. 3 is a side elevational view of the tongs mechanism taken at right angles to Fig. 2 with parts broken away and parts in section.

Fig. 4 is a bottom plan view of the take-out device with the tongs occupying a closed position, and Fig. 5 is a similar view of the device with the tongs in an open position.

In general the device illustrated comprises ware-lifting fingers carried by a tongs head which is in turn carried by the outer end of an arm oscillating about a horizontal axis. A parallel motion device is provided by means of which the tongs head is maintained in a vertical position. The tongs head contains a spring which continually urges the tongs fingers to gripping position and has provision for the inlet of fluid pressure to bear upon a piston for compressing the spring and moving the tongs fingers to nongripping position. The above described apparatus is the subject of the aforementioned application of Edward H. Lorenz.

The tongs fingers are themselves mounted on slides which are adapted, when the fingers are out of their gripping position (i. e. when the spring member is compressed), to slide freely and be lowered by the action of gravity or raised relative to the head, by a stop member which is connected to the gripping fingers and is adapted to contact with the top of the ware. However, when the spring is urging the gripping members toward or holding them in gripping position, the slide members bind upon their guides and up or down movement of the gripping fingers is prevented. Thus a device is provided which will automatically adjust the height of the gripping fingers to correspond with the height of the ware being gripped. The above described device is the subject of my copending application, Serial No. 217,489.

The diameters of the portions of the ware to be grasped by the fingers frequently vary. In my invention there may be three or more (preferably four) tongs fingers having ware-engaging portions tangent to the portion of the ware to be grasped thereby, and provision is made for opening and closing the fingers along approximate radii from the center of the ware so that the ware-engaging surfaces remain at all times tangent to the ware irrespective of its diameter.

Referring to the drawings:

The apparatus is shown as comprising an arm 10 which is mounted for oscillation about a horizontal shaft 11 fixed in the lower extremity of a downwardly extending arm or bracket 12. The arm 10 is oscillated between a ware-receiving station and a ware-delivery station, in the present instance between a buck or conveyor 13 and a lehr conveyor 14, by means of a sprocket chain 15 which engages a sprocket wheel 16 fixed to the arm 10 and which is actuated alternately in opposite directions by any suitable mechanism not shown. A shaft 17 is rotatably mounted in a bearing 18 formed on the outer end of the arm 10 and is provided at one end with a split sleeve 19 in which a vertically extending barrel or tongs carrier 20 is adjustably clamped by means of bolts 21. A sprocket wheel 22 is fixed to the inner end of the shaft 17 and is engaged by an endless sprocket chain 23 which also passes around a similar sprocket wheel 24 which is fixed to the shaft 11 the shaft 11 being in turn fixed against rotation in the bracket 12. By means of this construction the tongs mechanism, which will now be described, is maintained vertical during the swinging movement of the transfer arm 10.

The barrel 20 carries a fluid pressure cylinder 25 at its lower end. This cylinder is formed with a reduced portion 26 which is secured within the lower end of the barrel 20, and which is formed with an axial bore 27 extending vertically therethrough. A piston 28 is mounted for vertical reciprocation within the cylinder 25 and is provided with a piston rod 29 which extends loosely through the bore 27 and upwardly through the barrel 20. The piston 28 is urged upwardly by coil spring 30 which encircles the rod 29 and which is interposed between a sleeve 31 surrounding the part of the rod 29 adjacent to the reduced portion 26 of the cylinder 25 and an adjusting nut 32 which is screwed onto the upper end of the rod 29. This nut is adapted to engage an annulus 33 which is secured within the barrel 20 in order to adjustably limit the downward movement of the piston 28 when air pressure is applied within the cylinder 25 by any suitable valve mechanism (not shown). The upward movement of the piston 28 is adjustably limited by means of a stop screw 34 which is threaded in the upper end of a cap 35 which is in turn threaded onto the upper end of the barrel 20. This stop screw is engaged by the upper end of the rod 29 under the action of the spring 30 when air pressure in the cylinder 25 is relieved and limits the closing movement of the tongs mechanism.

The lower flanged edge of the cylinder 25 is provided with two diametrically disposed pairs of depending ears 36 and between each pair a tongs holder 37 is pivotally mounted by means of a pivot pin 38. Each tongs holder is a bell crank lever and is described more particularly below. The tongs comprise a pair of slides 39, provided with vertically extending slots 40 for vertical sliding engagement with bolts 41 which maintain the slides 39 in operative position on the holders 37. A pair of ware gripping members or fingers 42 are pivotally mounted adjacent the lower end of each of the slides 39 and are formed with inwardly projecting portions 43 for engagement with the neck of a bottle beneath the finish thereof. The tongs holders 37 are also provided with inwardly projecting arms 44 which are offset horizontally relative to each other and which are each pivotally connected to the lower end of one of a pair of links 45. The upper ends of the links 45 are pivotally connected to the piston 28 by means of a pin 46 and are maintained in spaced relation to each other by a spacing washer 47. By means of this construction, when air pressure is admitted to the cylinder 25, the piston 28 will be depressed, thus causing the slides 39 of the tongs to open and to separate the pairs of fingers 42, whereas when air pressure within the cylinder is relieved, the spring 30 will elevate the piston 28 and close the fingers 42 about the ware. It will thus be apparent that the fingers 42 engage the ware with a substantially constant predetermined spring pressure. As has been pointed out before, the upward movement of the piston 28, and hence the limit of the closing movement of the tongs, may be accurately adjusted according to the diameter of the neck of the ware by means of the adjusting screw 34, and the opening limit of the fingers 42 may be regulated by the nut 32.

In order to arrest the movement of the fingers 42 in alignment with the tongs engaging portion of the ware, or just below the finish of the bottle as shown in the drawing, a stop or bottle engaging member 48 is provided. This member is carried by the tongs and is provided with a pair of horizontally disposed oppositely extending arms 49 to each of which is secured a vertical rod 50. The rods 50 extend upwardly and slidably engage bearings 51 which are preferably formed integrally with the fluid pressure cylinder 25. These rods maintain the stop 48 horizontal in all vertical positions and maintain the ware engaging fingers 42 of the tongs in alignment with each other at all times. The stop 48 is also provided with transversely extending pairs of diverging guides 52 each of which extends loosely through an aperture 53 provided in each of the fingers 42. These guides tend to separate the fingers of each pair when the slides are swung outwardly and to close the fingers when the slides are swung inwardly as will presently be described.

In operation, let it be assumed that the barrel or tongs carrier 20 has been adjusted in the split bearing 19 so that the tongs at their extreme limit of travel toward the receiving station will occupy a position to grasp a relatively short bottle having a wide neck, a pint milk bottle for example. Also let it be assumed that a relatively tall bottle, a quart milk bottle for instance, has been conveyed to the receiving station for transfer to the lehr. In such a case, the stop 48 will first engage the top of the tall bottle and will arrest the movement of the tongs fingers in a position just below the neck finish thereof. By reason of the fact, however, that the arm 10 always oscillates through an arc of 180° it will continue its movement for a short time after the stop 48 engages the top of the bottle or until it completes its travel toward the receiving station. This continued movement of the arm 10 causes the barrel 20 and the tongs holders 37 carried thereby to also continue their downward movement, and the bolts 41 to slide downwardly in the slots 40 of the slides 39 which have been brought to rest by the stop 48. At the conclusion of this swinging movement of the arm 10, air pressure in the cylinder 25 is relieved, allowing the slides 39 to close and to carry the fingers 42 into engagement with the ware under the action of the spring 30 and the arm 10 is then again swung toward the delivery station. During this transferring movement the action of the spring 30 in maintaining the tongs in gripping engagement with the neck of the bottle causes the upper portions of the slides 39 to bind between the tongs holder 37 and the bolts 41, thus maintaining the tongs in their adjusted vertical position relative to the tongs carrier or barrel 20 until the bottle is released at the delivery station. As soon as air pressure is admitted to the cylinder 25 in order to force the slides 39 apart to separate the fingers 42 and to release the ware, and as soon as the arm 10 has begun its return movement to the buck, the slides 39 and the fingers 42 carried thereby will descend to their original position under the action of gravity so that in the event that the next bottle transferred is of less height, the tongs will occupy a position to grasp the same.

Now, with particular reference to Figs. 4 and 5 of the drawings, let it be assumed that a bottle having a neck of relatively small diameter, such as a prescription bottle for example, has been conveyed to the receiving station for transfer to the lehr. In such case as soon as movement of the tongs has been arrested at the receiving station with the fingers 42 in position to grasp the neck of the bottle and as soon as air pressure in the cylinder 25 has been relieved, the slides 39 carrying the fingers 42 will swing inwardly under the action of the spring 30. During this inward movement of the slide 39, the fingers 42 of each pair will swing toward each other through their engagement with the angularly disposed guides 52 and in a direction transverse to the swinging movement of the slide 39. The resultant movement of these two transverse swinging movements imparted to the fingers 42 will be in a substantially radial direction with respect to the longitudinal axis of the bottle and will continue until the fingers engage the ware. Conversely, after the ware has been transferred to the delivery station and air pressure is admitted to the cylinder 25, the slides 39 will be forced apart against the action of the springs 30 with the result that the fingers 42 will separate in a generally radial direction to release the ware. By means of this construction, the fingers 42 of the tongs open and close in different transverse directions so that they will engage the neck of the ware tangentially at substantially equidistant circumferentially spaced points, whether the ware be of the wide or narrow neck variety.

It will be apparent from the foregoing that a very simple and efficient mechanism is provided whereby the tongs will automatically adjust themselves to handle ware both varying in height and varying in neck diameter while the device is in operation and that such ware may be transferred regardless of the order and sequence in which it is delivered to the receiving station by the buck.

It will be understood that the several necessary elements constituting the invention may be varied in proportion, arrangement and mode of operation without departing from the nature and scope of the invention as set forth in the appended claims.

I claim:

1. Apparatus for handling glassware comprising an arm mounted for movement between a ware receiving station and a ware delivery station, tongs mechanism carried by said arm, said tongs comprising a pair of gripping members each consisting of a pair of fingers, and means for moving said members toward and away from each other and simultaneously moving the fingers of each pair toward and away from each other.

2. Apparatus for handling glassware comprising an arm mounted for movement between a ware receiving station and a ware delivery station, tongs mechanism carried by said arm, said tongs mechanism comprising a pair of holders, a pair of ware gripping members pivotally mounted on each of said holders, and means for moving said holders toward and away from each other and simultaneously swinging said gripping members about their pivots.

3. Apparatus for handling glassware comprising an arm mounted for movement between a ware receiving station and a ware delivery station, a carrier mounted on said arm, a plurality of tongs holders pivoted to said carrier, tongs members pivoted to each of said holders for pivotal movement in a direction transverse to that of said holder and means for actuating said members and said holders whereby a substantially uniform gripping action and a stable support may be provided for ware of varying diameters.

4. Apparatus for handling glassware comprising an arm mounted for movement between a ware receiving station and a ware delivery station, a carrier mounted on said arm, a plurality of tongs holders pivoted to said carrier, tongs members pivoted to each of said holders for pivotal movement in a direction transverse to that of said holders and guides for guiding said members and said holders to grasp the ware, whereby a substantially uniform gripping action may be provided for ware of varying diameters.

5. Apparatus for handling glassware comprising an arm mounted for movement between a ware receiving station and a ware delivery station, a carrier mounted on said arm, tongs holders pivotally mounted on said carrier, a pair of ware gripping members pivotally mounted on each of said holders for movement in a direction transverse to that of said holders, means for moving said holders toward and away from each other, and guides for guiding said ware gripping members toward and away from each other to grasp the ware, whereby a substantially uniform gripping action may be provided for ware of varying diameters.

6. Apparatus for handling glassware comprising an arm mounted for movement between a ware receiving station and a ware delivery station, a carrier mounted on said arm, tongs holders pivotally mounted on said carrier, a pair of ware gripping members pivotally mounted on each of said holders for movement in a direction transverse to that of said holders, pneumatic means for moving the pairs of ware griping members away from each other, and resilient means for moving said members towards each other to grasp the ware, whereby a substantially uniform gripping action may be provided for ware of varying diameters.

7. In apparatus for handling glassware, ware supporting means comprising a plurality of holding members, each member having a plurality of pivoted fingers for gripping the ware, means for moving the ware holding means, and means for closing the fingers substantially radially of the center line of the ware being gripped.

8. In apparatus for handling glassware, a tongs carrier, a plurality of tongs holders pivoted on said carrier, a plurality of tongs fingers pivoted on each of said holders, means for moving said carrier, automatic means for adjusting the height of said fingers to a height suitable to the height of the ware being gripped, and automatic means for opening and closing said fingers substantially radially of the center line of the ware being gripped.

Signed at Hartford, Conn., this 22nd day of September, 1927.

JOHN E. SCHRODER.